Dec. 3, 1929.  J. W. BAUER  1,737,873
PLANT SUPPORTING CLIP
Filed Oct. 19, 1927
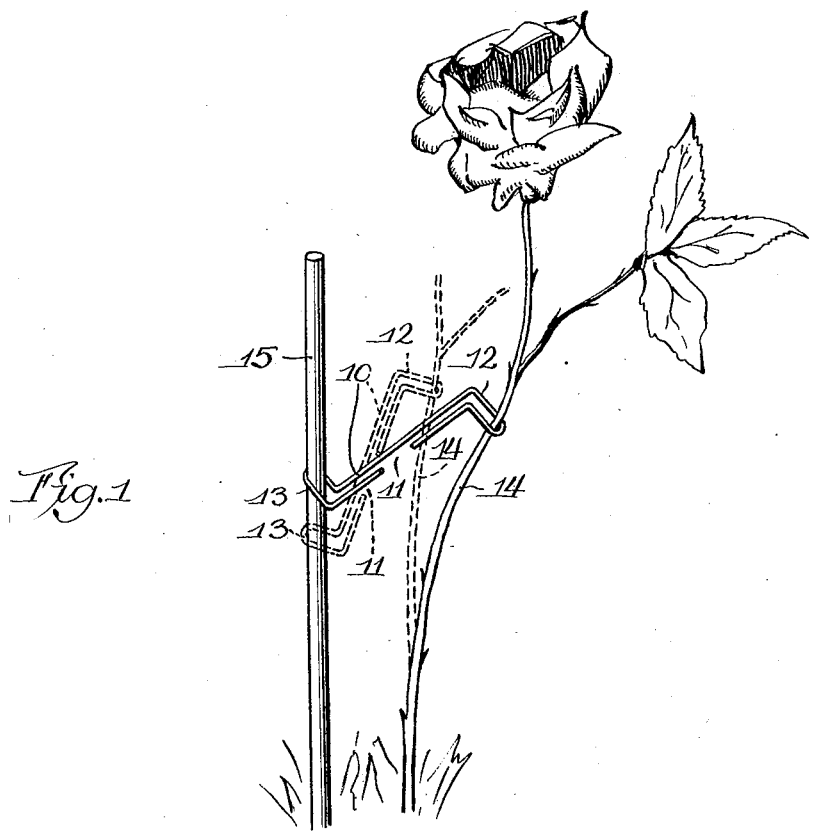
Fig.1
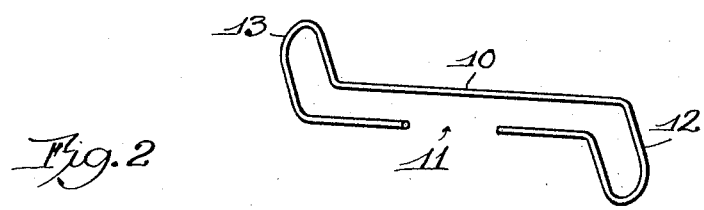
Fig.2
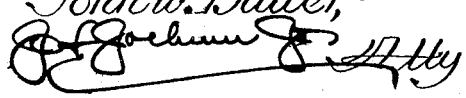
Inventor,
John W. Bauer,
By Patented Dec. 3, 1929

1,737,873

UNITED STATES PATENT OFFICE

JOHN W. BAUER, OF NAPERVILLE, ILLINOIS

PLANT-SUPPORTING CLIP

Application filed October 19, 1927. Serial No. 227,134.

This invention relates to improvements in supporting clips adapted to secure a plant stem to a supporting stake or wire whereby the plant will be held up and prevented from drooping or falling, and one of the objects of the invention is to provide an improved clip of this character which will not only be light and durable, but will be of a simple construction and effective and efficient in operation, readily applicable or detachable when desired, and which will not injure the plant and at the same time will not interfere with the swaying of the plant by the wind.

In plant culture it is necessary, at times, to spray the plants and this is sometimes done by means of a nozzle, the spraying liquid being delivered with considerable force to the plants, with the result that the plants are violently vibrated by the force of the spraying liquid striking them, or by a sudden gust of wind when the plants are in a hot house and the door suddenly opened.

With the supporting or tying clips heretofore used such violent spraying or vibration of the plants would result in the clips becoming detached from either the plant or the support to which it is connected.

It is another object of the present invention to provide an improved clip of this character embodying all of the attributes of the prior clips or ties and also improved means for preventing the clip or tie from becoming accidentally detached from the plant or from the stake or support.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which Figure 1 is a perspective view of a clip constructed in accordance with the principles of this invention, showing in full lines the clip in use for supporting a plant from a stake, and in dotted lines the position the clip will assume with respect to the plant and stake when the stem of the plant is vibrated.

Figure 2 is a detail perspective view of the clip.

Referring more particularly to the drawing the numeral 10 designates the supporting clip which is constructed of a single piece of suitable material, preferably ductile wire of any desired gauge.

The clip is formed from a single piece of wire bent into shape to form an elongated loop having a permanent entrance opening 11 in one side thereof. This entrance may be of any desired size but is preferably of a size to accommodate or receive a stake or support of substantial size and also the stalk or stem of a plant. The entrance opening 11 is spaced from both ends of the loop.

The ends of the loop are deflected laterally as at 12—13, and on opposite sides of the body portion thereof to form seats at the ends of the loop on opposite sides of the body portion of the clip and in which seats the stake and stem of the plant are seated.

The extremities 12 and 13 may be deflected at any desired angle with respect to the body portion of the clip and the clip may be of any desired size.

In use the clip or tie is applied to the plant stem 14 by engaging the same upon the stem by passing the stem through the entrance opening 11 and then drawing the clip across the stem so that the stem will rest in the seat formed by the extremity 12. The clip is then drawn towards the stake or support 15, causing the plant stem to be deflected, until the opening 11 is in a position that the stake or support 15 will pass therethrough. The clip is then hooked upon the stake or support by drawing the clip across the stake or support after the latter has been inserted through the entrance opening 11 and until the seat or deflected end 13 of the clip engages the stake or support. At this time the stress of the stem 14 exerted upon the clip will hold the same in the position shown in full lines in Figure 1.

When the plant stem 14 is vibrated under normal conditions by the wind or air currents, the stem 14 will vibrate naturally, the clip 10 riding upon the support 15 and stem 14 so as not to interfere with such movement of the plant.

Should, however, a violent vibration be imparted to the plant stem to cause it to swing for a considerable distance, the parts will assume the position shown in dotted lines in Figure 1, the seat or extremity 13 of the clip riding upon the stake or support 15, thereby preventing the clip from becoming accidentally disengaged from the stake or support.

The clip may be readily detached by either moving the clip across the stake or support 15 until the entrance opening 11 is opposite to the support or by holding the clip and swinging the plant stem out of the seat 12 and into a position opposite to the entrance opening 11.

With this improved construction it will be manifest that it will be impossible for the clip to become accidentally disengaged from either the stake or support or the plant stem, and at the same time the plant stem will not be injured by being cut by the clip.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination, a relatively rigid supporting member, a clip for holding the stem of a growing plant, said clip being formed from a single piece of material shaped to form an elongated loop, a portion of one side being removed to form an entrance opening of considerable size, the extremities of the loop remote from said entrance opening being deflected laterally with respect to and on opposite sides of the body, one of said deflected extremities loosely engaging said member and freely movable longitudinally thereupon, the other of said deflected extremities loosely engaging the plant stem and freely movable longitudinally thereupon.

2. A clip for holding the stem of a growing plant, said clip being formed from a single piece of material shaped to form an elongated loop, a portion of one side being removed to form an entrance opening of considerable size, the extremities of the loop remote from said entrance opening being deflected laterally with respect to the body and on opposite sides thereof.

3. A clip for holding the stem of a growing plant, said clip being formed from a single piece of material shaped to form a body portion, the ends of the body being shaped to form open seats disposed on opposite sides of and out of the plane of the body portion of the clip therebetween.

4. A clip for holding the stem of a growing plant, said clip being shaped from a single piece of material to form a body portion, an open seat at one end of and to one side of and out of the plane of said body for receiving and holding the stem of the plant for loosely sliding thereupon, and means at the other end on the opposite side and out of the plane of the body for loosely engaging a support to slide freely thereupon.

5. A clip for holding the stem of a growing plant, said clip being shaped from a single piece of material to form a body portion, an open seat at one end of said body and to one side of the plane of said body for receiving and holding the stem of a plant and for freely sliding thereupon, and an open seat at the other end and on the opposite side and out of the plane of the body for receiving and holding a stake or support and loosely sliding thereupon.

6. A clip for holding the stem of a growing plant, said clip being shaped from a single piece of material to form a body portion, an open seat at one end of said body and to one side of said body for receiving and holding the stem of a plant and for freely sliding thereupon, and an open seat at the other end and on the opposite side of the body for receiving and holding a stake or support and for freely sliding thereupon, the entrance opening to said seats being disposed on the same side of the said body portion.

7. As an article of manufacture a plant supporting clip formed from a single piece of ductile material, one end of said material being bent back upon itself and deflected laterally to one side of the body to form a seat, the end of the bent portion being arranged parallel to and spaced from the body of the clip, the other end of said body being bent back upon itself and deflected laterally to the opposite side of the body to form a seat, the end of the last said bent portion being arranged parallel to and spaced from the body of the clip, the extremities of said ends terminating considerably short of each other.

In testimony whereof I have signed my name to this specification, on this 15th day of October, A. D. 1927.

JOHN W. BAUER.